United States Patent
Akagi et al.

[11] Patent Number: 5,947,545
[45] Date of Patent: Sep. 7, 1999

[54] AUTOMOTIVE SUN VISOR EQUIPPED WITH DOUBLE CARD HOLDERS

[75] Inventors: Hiroomi Akagi, Wako; Takeshi Abe, Koza-gun, both of Japan

[73] Assignees: Honda Giken Kogyo Kabushiki Kaisha; Kasai Kogyo Co., Ltd., both of Tokyo, Japan

[21] Appl. No.: 08/897,690

[22] Filed: Jul. 21, 1997

[30] Foreign Application Priority Data

Sep. 30, 1996 [JP] Japan ..................................... 8-259279

[51] Int. Cl.⁶ ....................................................... B60R 7/05
[52] U.S. Cl. ............................ 296/97.5; 224/312; 383/39
[58] Field of Search ................................ 296/97.1, 97.5, 296/97.6, 37.13; 224/277, 312, 563; 383/39

[56] References Cited

U.S. PATENT DOCUMENTS

| 466,723 | 1/1892 | Lorenz | 383/39 |
|---|---|---|---|
| 5,117,724 | 6/1992 | Gardner | 383/39 |
| 5,516,018 | 5/1996 | Eskandry | 224/312 |
| 5,590,827 | 1/1997 | Nimpoeno | 224/312 |

FOREIGN PATENT DOCUMENTS

| 2342573 | 3/1975 | Germany | 296/37.13 |
|---|---|---|---|
| 1099694 | 1/1968 | United Kingdom | 296/97.5 |
| 2 025 210 | 1/1980 | United Kingdom . | |

*Primary Examiner*—Dennis H. Pedder
*Attorney, Agent, or Firm*—Dickstein Shapiro Morin & Oshinsky LLP

[57] ABSTRACT

In an automotive sun visor equipped with double card holders which are arranged on one side of the sun visor main body one next to the other, one of the card holders is provided with a communication passage for communication with the opening of the other card holder so that an elongated ticket may be received from the opening of the one card holder, and, via the communication passage, retained in both the card holders. Thereby, the card holders can securely retain not only regular cards but also elongated objects such as tickets in the card holders.

5 Claims, 3 Drawing Sheets

AUTOMOTIVE SUN VISOR EQUIPPED WITH DOUBLE CARD HOLDERS

TECHNICAL FIELD

The present invention relates to an automotive sun visor equipped with double card holders which are suitable for storing a plurality of cards and tickets, and in particular to an automotive sun visor equipped with double card holders which are capable of safely storing elongated paper strips such as toll road tickets.

BACKGROUND OF THE INVENTION

Automotive sun visors are commonly placed in the passenger compartment of a motor vehicle, opposite the vehicle occupants seated in the front seats. Such sun visors are normally adapted to be turned to a desired position from the retracted position close to the roof lining to the operative position either along the front windshield or the side window so as to protect the vision of the vehicle occupants from the glares of the sun light and the head lights of the oncoming vehicles at night.

FIG. 6 is a front view of a conventional automotive sun visor, and FIG. 7 is a sectional view of this sun visor. This automotive sun visor 1 comprises a sun visor main body 2 having a desired light shading area, and an L-shaped rotary shaft 3a mounted to a bracket 3b secured to a ceiling surface for rotatably supporting the sun visor main body 2.

Because the automotive sun visor 1 is located near the vehicle occupant, it is commonly equipped with a card holder for storing various cards and toll road tickets. To allow a large number of cards and toll road tickets to be stored in a neat fashion, it has been proposed to arrange a pair of card holders 4 and 5 one next to the other as illustrated in the drawings.

Such double card holders 4 and 5 may be formed by a pair of PVC sheet pieces having a substantially same shape, and welded to suitable locations on the sun visor surface skin member 2a which makes up the material for the sun visor main body 2.

The card holders 4 and 5 are formed on one side of the sun visor main body 2 by assigning an edge of each of the PVC sheet pieces as an opening edge 4a or 5a of the card holder 4 or 5, and welding the remaining three side edges to the surface of the sun visor surface skin member 2a. The user can therefore place gas station membership cards, toll road prepaid cards, toll road tickets or the like in the double card holders 4 and 5 from their respective openings 6 and 7.

However, when the user wishes to place a card C such as a gas station membership card and a toll road ticket T, a problem may arise. Suppose that the card C is placed in the card holder 5 from the opening 7 of this card holder 5, and that the ticket T is placed in the card holder 4 from the opening 6. Because the ticket T has a relatively large length, and is therefore relatively less firmly retained, the ticket T may fall off due to the vibrations of the traveling vehicle or the turning of the sun visor 1, as indicated by the arrow in FIG. 6. It has therefore been strongly desired to be able to more firmly retain items such as toll road tickets T.

BRIEF SUMMARY OF THE INVENTION

In view of such problems of the prior art, a primary object of the present invention is to provide an automotive sun visor equipped with double card holders which can neatly store not only regular cards but also elongated sheet objects such as toll road tickets.

A second object of the present invention is to provide an automotive sun visor equipped with double card holders which is improved in convenience without any additional cost.

A third object of the present invention is to provide an automotive sun visor equipped with double card holders which is durable in use.

According to the present invention, these and other objects can be accomplished by providing an automotive sun visor, comprising: a sun visor main body having a major surface defining a certain area; and at least a pair of card holders each defined by a sheet piece attached over the major surface so as to define a pocket for receiving a card-like object, and placed one next to the other; wherein a first one of the card holders includes an opening edge, a pair of lateral edges secured to the major surface, and a bottom edge located opposite to the opening edge and defining a communication passage; and a second one of the card holders includes an opening edge disposed adjacent and opposite to the bottom edge of the first card holder, a pair lateral edges secured to the major surface, and a bottom edge located opposite to the opening edge of the second card holder.

Therefore, these two card holders can be used not only for storing a large number of regular cards but also for storing an elongated sheet object by passing it from the opening of the first card holder, and via the communication passage into the second card holder. Because the elongated sheet object can be retained by both the card holders over a large part of the length of the object, it is possible to firmly retain the object against accelerations and vibrations which the sun visor may be subject to during use. The bottom edge of the second card holder may also be open for the convenience of storing elongated sheet objects, but may also be closed so as to avoid the card or other objects stored in the card holders from falling off from the open bottom edge. Typically, the card holders are substantially rectangular in shape, and placed in such a manner that the opening edges and the bottom edges of these card holders are horizontally aligned on the sun visor.

Typically, the sun visor main body comprises a sun visor core member having a certain thickness, and a surface skin member covering the sun visor core member, the sheet pieces for defining the card holders being attached to the surface skin member. The sun visor core preferably consists of a bead foamed molded member given with a prescribed shape, and the material of the bead foamed molded member may be PP beads, PS beads or PE beads. To increase the rigidity of the sun visor core, a wire frame may be insert molded inside the sun visor core, and parts such as the support to pivotally support the rotary shaft, and the auxiliary knob adapted to be engaged by a support portion disposed on the vehicle body may be secured to the wire frame.

The sun visor surface skin member as well as the sheet pieces for defining the card holders may consist of any suitable material, but is preferably made of a PVC sheet when the double card holders are to be welded thereto by high frequency welding because the PVC sheet is particularly suited for high frequency welding. Normally, for the convenience of mass production, a pair of sun visor surface skin members such as PVC sheets are placed over the upper and lower surfaces of the sun visor core, and they are thermally joined and cut along the outer periphery of the product before the sun visor core is covered by the surface skin member.

It is also possible to use fabric which is suited for high frequency welding. When the card holders are formed by ultrasonic welding or sewing, other materials may be freely selected for the sun visor surface skin member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
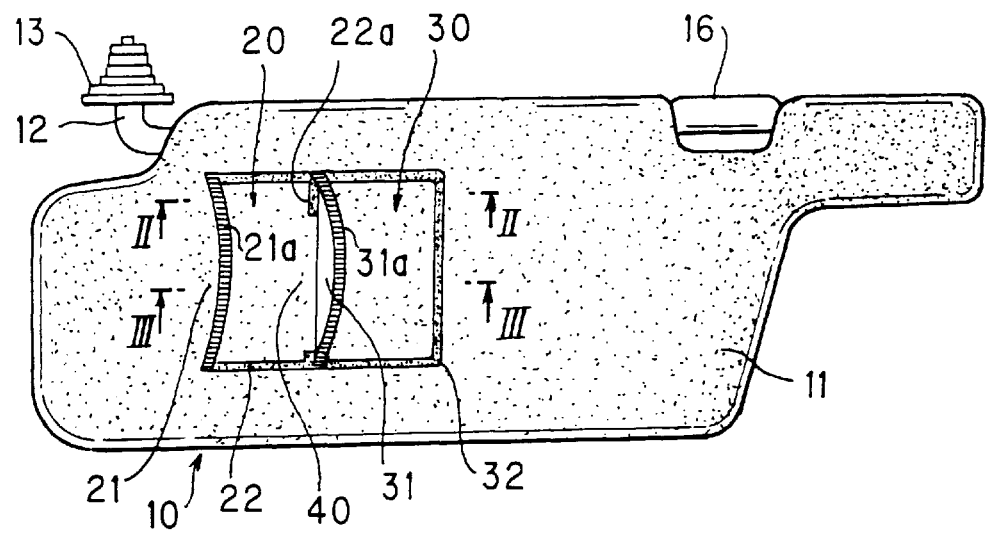
FIG. 1 is a front view of the first embodiment of the automotive sun visor according to the present invention.
Figure 2:
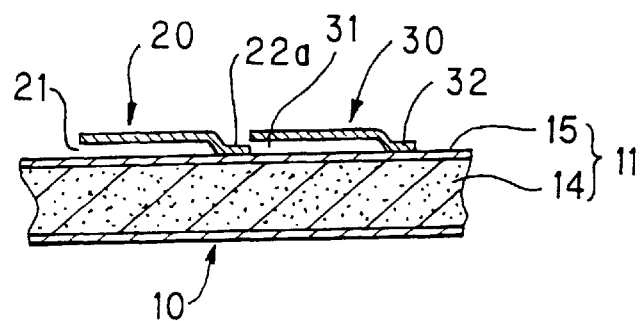
FIG. 2 is a sectional view taken along line II—II of FIG. 1.
Figure 3:
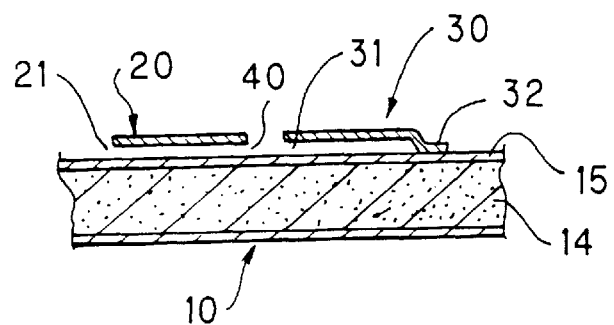
FIG. 3 is a sectional view taken along line III—III of FIG. 1.

Referring to FIGS. 1 to 3, the automotive sun visor 10 comprises a sun visor main body 11 having a desired light shading area, and an L-shaped rotary shaft 12 mounted to a bracket 13 secured to a ceiling surface for rotatably supporting the sun visor main body 11.

Therefore, by turning the sun visor main body 11 around the rotary shaft 12 and turning the rotary shaft 12 itself inside the bracket 13, it is possible to turn the sun visor both in the vertical and lateral directions so that the sun visor may be placed at will either at the retracted position close to the roof lining or the operative position either along the front windshield or along the side window.

Referring to FIGS. 2 and 3, the sun visor main body 11 comprises a sun visor core 14, and a sun visor surface skin member 15 covering the sun visor core 14. The sun visor core 14 is essentially made of a PP bead foam molded member having a prescribed shape and a certain thickness, and is light in weight and durable against impulsive loads with the added advantage of economy.

Although it is not shown in the drawings, a wire frame is insert molded in the sun visor core 14 to achieve a desired rigidity, and a support for rotatably supporting the rotary shaft 12 and an engagement knob 16 are fixedly secured to the wire frame.

The sun visor surface skin member 15 is made of a PVC sheet, and the sun visor main body 11 is formed by placing a pair of PVC sheets on the upper and lower sides of the sun visor core 14, which is molded into a desired shape, and welding and cutting the PVC sheets along the outer periphery of the final product or the sun visor 10.

The structure of the sun visor main body 11 is not limited by the above described embodiment. For instance, instead of a PP bead foamed molded member, a PS bead foamed molded member or a PE bead foamed molded member may be used for forming the sun visor core 14. It is also possible to use urethane a foam pad or an injection molded member having a core member inserted therein. The sun visor surface skin member 15 may be made of other resin sheets, fabric sheets and pile surface skin members, instead of a PVC resin sheet.

The automotive sun visor 10 of the present invention is characterized by the provision of double card holders 20 and 30 which are convenient to use.

Figure 4:
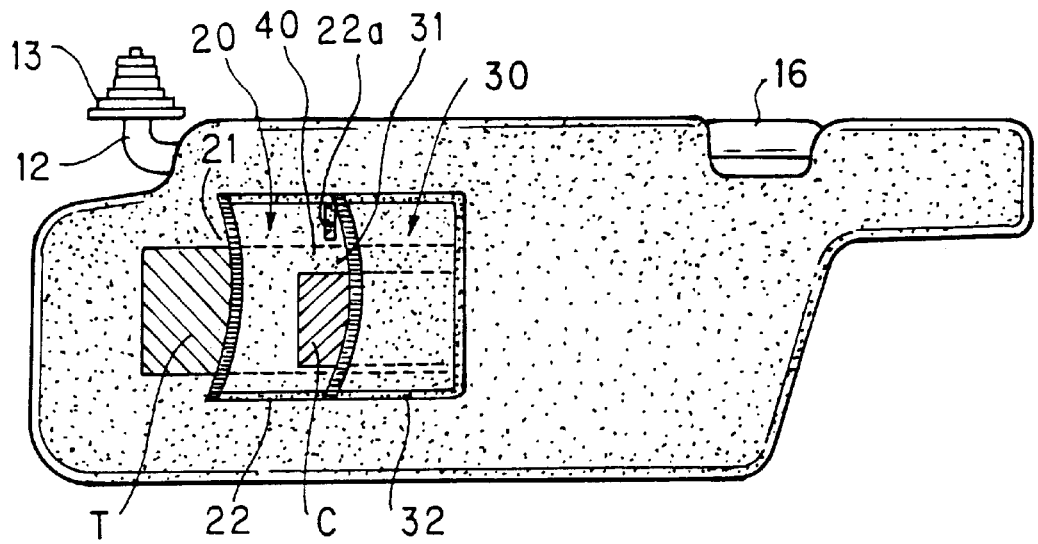
FIG. 4 is an illustrative view for showing the mode of storing cards and tickets in the automotive sun visor which is given as the first embodiment of the present invention.

More specifically, the card holders 20 and 30 are arranged on the left hand side of the sun visor main body 11 one next to the other in a tandem relationship, and each of the card holders 20 and 30 is adapted to receive cards C and tickets T from the opening 21 or 31 provided along the left edges thereof as illustrated in FIG. 4. Additionally, one of the card holders 20 is provided with a communication passage 40 for communication with the opening 31 of the other card holder 30.

The communication passage 40 is formed as described in the following.

The first card holder 20 is formed by attaching the two lateral sides of a rectangular PVC sheet piece, and a part of the bottom edge thereof to the sun visor surface skin member 15 by welding. Therefore, the first card holder 20 is provided with an opening edge 21a and a communication passage 40 defined in the bottom edge opposite to the opening edge 21a, and is otherwise closed by a weld seam 22.

The second card holder 30 is formed by attaching a similar rectangular PVC sheet piece along the three sides thereof, excluding an opening edge 31a, to the sun visor surface skin member 15 by welding. The second card holder 30 is thus closed along the three sides by a welding seam 32.

As illustrated in FIG. 4, an extension 22a of the weld seam 22 extends partly into the communication passage so as to define a limited opening width of the communication passage 40 which communicates the interiors of the card holders 20 and 30 one with the other.

The card holders 20 and 30 are formed as described in the following.

Before forming the sun visor main body 11, PVC sheet pieces which are intended to form the card holders 20 and 30 are placed on the surface of the PVC blank sheet which is to be used for the sun visor surface skin member 15. The first card holders 20 is welded along the periphery thereof excluding the non-welded portion which is to define the opening 21 and the communication passage 40. The second card holder 30 is welded along the periphery thereof excluding the non-welded portion which is to define the opening 31. The two card holders 20 and 30 are thus formed on prescribed locations of the surface skin member 15. The surface skin member 15 having the card holders 20 and 30 attached thereon by welding is then placed on the outer surface of the sun visor core 14 so as to form the sun visor main body 11.

The card holders may be secured by other methods such as ultrasonic welding or other thermal welding process, or sewing, instead of relying on high frequency welding. The outer peripheries of the card holders may be applied by a knurl roller so as to achieve an aesthetically desirable appearance, and allow cards C and tickets T to be more firmly retained.

Therefore, when storing cards C and tickets T, as shown in FIG. 4, relatively smaller cards C such as gas station membership cards and toll road prepaid cards are stored in the second card holder 30, and relatively elongated tickets T such as toll road tickets are placed into the interior of the first card holder 20 from its opening 21 and passed into the second card holder 30 via the communication passage 40 so that the elongated ticket T may be firmly stored in the card holders 20 and 30.

Thus, the present invention provides the advantage of allowing relatively elongated sheet objects such as toll road tickets to be neatly stored, in addition to various regular cards such as gas station membership cards and toll road prepaid cards, and are therefore more convenient than the conventional card holders.

Instead of the PVC sheet pieces, it is also possible to use other resin sheets which are suitable for high frequency welding, resin sheets coated with an welding aiding agent thereon, or fabric sheets. Instead of high frequency welding, other thermal welding processes such as ultrasonic welding or a sewing process may be employed.

As can be appreciated from the above description, because the card holders, which are arranged one next to the other, are communicated with each other by the communication passage, an elongated ticket, which is inserted from the opening of the one card holder, passes through the communication passage, and can be jointly retained by both the card holders so that a ticket such as a toll road ticket having an elongated shape can be firmly retained.

For favorably guiding the elongated sheet object received from the opening of the first card holder smoothly into the opening of the second card holder via the communication passage, an extension of an attaching seam may extend along a part adjoining said communication passage so as to define a fixed guide portion for guiding the object. The extension of the attaching seam, which would consist of a welding seam when high frequency welding is used, is also beneficial for reinforcing the card holders against forces to peel the card holders off the surface skin member.

Figure 5:
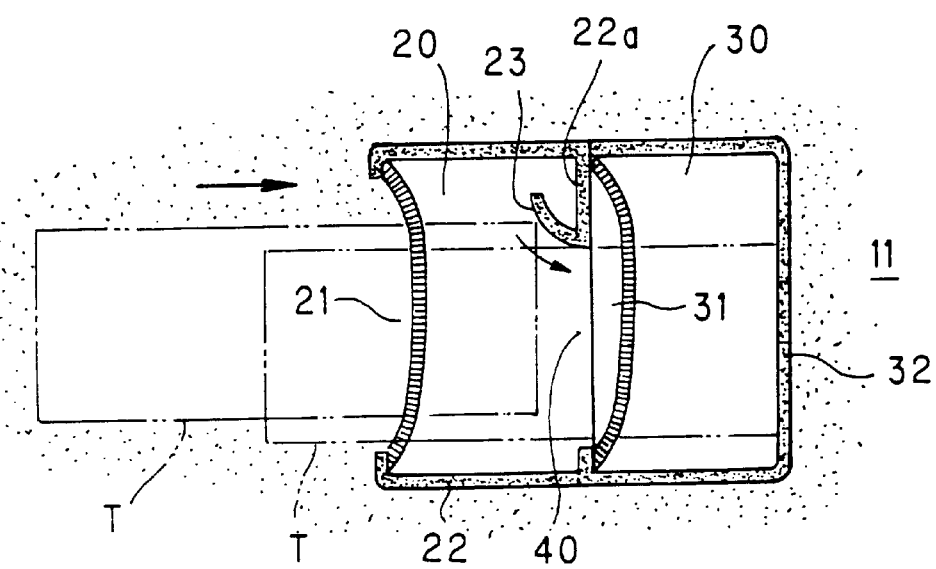
FIG. 5 is a simplified front view of the second embodiment of the automotive sun visor according to the present invention.
Figure 6:
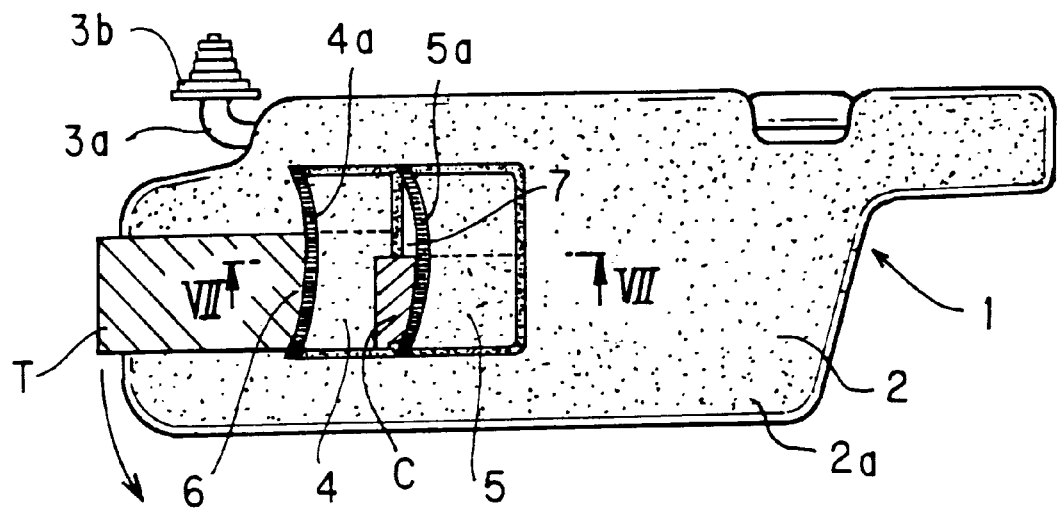
FIG. 6 is a front view showing a conventional automotive sun visor.
Figure 7:
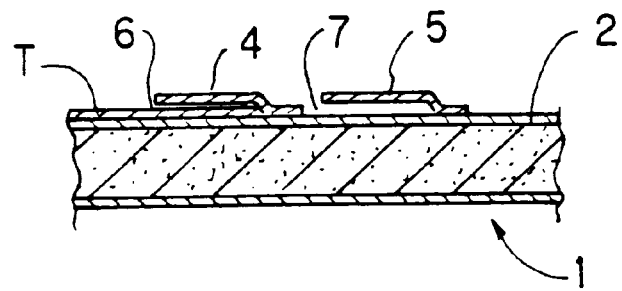
FIG. 7 is a sectional view taken along line IV—IV of FIG. 6.

FIG. 5 shows another embodiment of the present invention which is improved in convenience and resistance against peeling.

In this embodiment, the first card holders 20 is not different from that of the previous embodiment in that the fixed portion 22a which opposes the opening edge 21a forms the communication passage 40 as a non-welded portion. Additionally, an R-shaped fixed guide portion 23 extends from an end of the welding seam extension 22a as an additional extension into the interior of the first card holder 20. The second card holders 30 of this embodiment is not different from that of the previous embodiment.

Therefore, as indicated by the double-dot chain-dot line of FIG. 5, when inserting an elongated ticket T into the card holders 20 and 30 from the opening 21, the edge of the ticket T is engaged by the fixed guide portion 23 so that the ticket is positively guided, as it is received into the second card holder 30, in a highly smooth manner. Thus, the ticket is firmly retained jointly by both the card holders 20 and 30.

The fixed guide portion 23 may also be provided with a linear or other shape as long as it serves as a guide for the ticket or other elongated sheet object passing through the communication passage 40.

This fixed guide portion 23 can compensate for a reduction in mechanical strength of the weld seam 22 due to the provision of the non-welded portion, and this embodiment can therefore provide double card holders which are relatively free from the possibility of peeling and have a high mechanical strength in the welded parts thereof.

The bottom edge of the second card holder 30 may also be open for the convenience of storing elongated sheet objects T, but may also be closed so as to avoid the card or other objects C, T stored in the card holders 20, 30 from falling off from the open bottom edge.

As described above, the automotive sun visor equipped with double card holders according to the present invention has the following advantages.

(1) According to both the first and second embodiments of the present invention, in the double card holders which are arranged on one side of the sun visor main body one next to the other, because the communication passage is formed in one of the card holders for communication with the opening of the other card holder, an elongated ticket such as a toll road ticket can be stored from the opening of one of the card holders and, via the communication passage, into the other card holder so as to be retained by both the card holders. Thereby, elongated tickets can be neatly stored along with regular cards, and can be retained in a more secure manner so that an improved convenience can be achieved.

(2) According to the second embodiment of the present invention, because the fixed guide portion extends from an edge of the fixed portion which adjoins the communication passage formed in one of the card holders into the other card holder, an elongated ticket can be favorably guided by the fixed guide portion into the other card holder. Additionally, the fixed guide portion compensates for the reduction in the mechanical strength of the non-welded portion so that the possibility of peeling can be eliminated, and a high mechanical strength can be achieved.

What we claim is:

1. An automotive sun visor, comprising:

a sun visor main body having a major surface defining a certain area; and at least a pair of card holders each defined by a sheet piece attached over said major surface so as to define a pocket for receiving a card-like object and placed one next to the other;

wherein a first one of said card holders includes an opening edge, a pair of lateral edges secured to said major surface, and a bottom edge located opposite to said opening edge;

a second one of said card holders includes an opening edge disposed adjacent and opposite to said bottom edge of said first card holder, a pair lateral edges secured to said major surface, and a bottom edge located opposite to said opening edge of said second card holder;

a communication passage is defined by communication of said bottom edge located opposite to said opening edge between said first one and said second one of said card holders;

an extension of an attaching seam of said bottom edge of the first card holder extends along a part adjoining said communication passage so as to define a fixed guide portion for guiding an object passed into said first card holder through said communication passage, said fixed guide portion being acutely angled to said attaching seam.

2. An automotive sun visor according to claim 1, wherein said bottom edge of said second card holder is closed.

3. An automotive sun visor according to claim 2, wherein said card holders are substantially rectangular in shape.

4. An automotive sun visor according to claim 1, wherein said sun visor main body comprises a sun visor core member, and a surface skin member covering said sun visor core member, said sheet pieces for defining said card holders being attached to said surface skin member.

5. An automotive sun visor according to claim 1, wherein said sheet pieces for defining said card holders are attached to said surface skin member by high frequency welding.

* * * * *